United States Patent
Koenekamp et al.

(10) Patent No.: US 8,236,456 B2
(45) Date of Patent: Aug. 7, 2012

(54) BIDIRECTIONAL WATER SEPARATOR

(75) Inventors: Andreas Koenekamp, Darmstadt (DE); Dirk Rensink, Mainz (DE); Marcus Koch, Recklinghausen (DE); Michael Hahn, Essen (DE)

(73) Assignee: GM Global Technology Operations LLC, Detroit, MI (US)

( * ) Notice: Subject to any disclaimer, the term of this patent is extended or adjusted under 35 U.S.C. 154(b) by 1160 days.

(21) Appl. No.: 11/779,917

(22) Filed: Jul. 19, 2007

(65) Prior Publication Data

US 2009/0023019 A1    Jan. 22, 2009

(51) Int. Cl.
*H01M 8/04* (2006.01)
*H01M 8/24* (2006.01)

(52) U.S. Cl. .......... 429/413; 429/414; 429/471

(58) Field of Classification Search .......... None
See application file for complete search history.

(56) References Cited

U.S. PATENT DOCUMENTS

| 5,366,818 | A | 11/1994 | Wilkinson et al. |
| 6,579,637 | B1 | 6/2003 | Savage et al. |
| 7,041,411 | B2 | 5/2006 | Walsh |
| 2007/0072020 | A1* | 3/2007 | Arthur et al. .......... 429/22 |
| 2008/0311442 | A1 | 12/2008 | Sienkowski et al. |

FOREIGN PATENT DOCUMENTS

DE  102008028007 A1  1/2009
JP  2006-120503  * 5/2006

* cited by examiner

*Primary Examiner* — Jonathan Crepeau
(74) *Attorney, Agent, or Firm* — Dinsmore & Shohl LLP

(57) ABSTRACT

A flow shifting fuel cell with water separator. The water separator is used to control the amount of moisture that passes through the anode flowpath of one or more fuel cells in one or more fuel cell stacks. The water separator is made up of a housing to direct the flow of a moisture-bearing fluid as well as act as a collection and container for separated moisture. Fluid that is cyclically passing through the fuel cell stack as part of its flow shifting mode of operation oscillates back and forth across a separation chamber formed within the water separator, thereby allowing bidirectional control of the moisture content within the fluid. A drain is formed in the separation chamber to allow removal of condensed water.

9 Claims, 10 Drawing Sheets

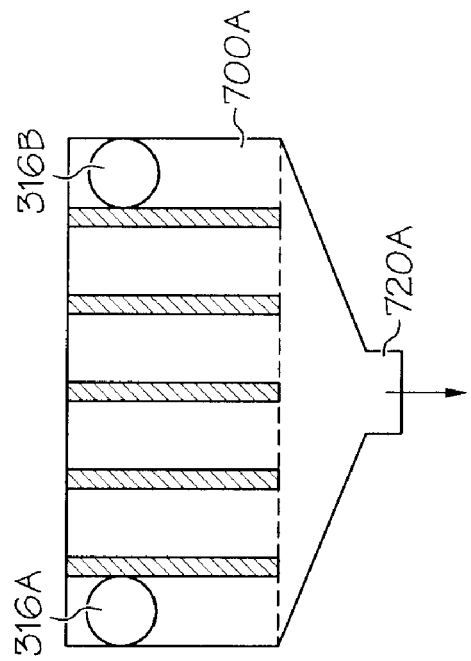
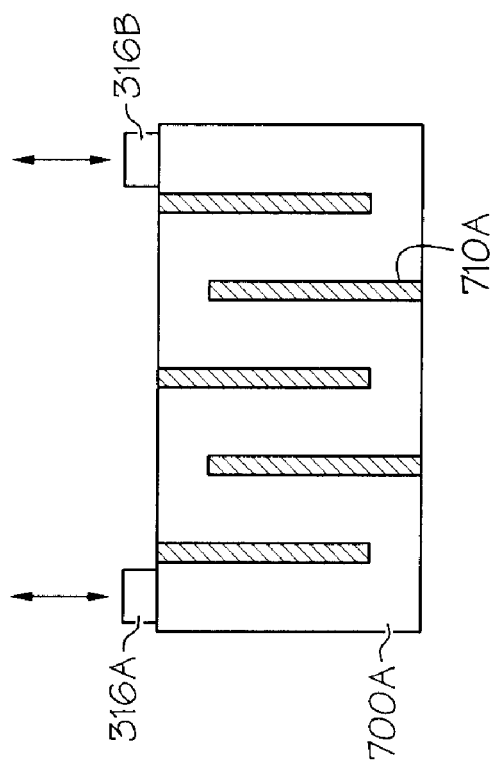
FIG. 4A
FIG. 4B

BIDIRECTIONAL WATER SEPARATOR

BACKGROUND OF THE INVENTION

The present invention relates generally to a fuel cell water management system, and more particularly to passively controlling the presence of water in a flow shifting fuel cell anode flowpath.

In a typical fuel cell system, hydrogen or a hydrogen-rich gas is supplied through a flowpath to the anode side of a fuel cell while oxygen (such as in the form of atmospheric oxygen) is supplied through a separate flowpath to the cathode side of the fuel cell. In one form of fuel cell, called the proton exchange membrane (PEM) fuel cell, an electrolyte in the form of a proton-transmissive membrane is sandwiched between the anode and cathode to produce a layered structure commonly referred to as a membrane electrode assembly (MEA). Each MEA forms a single fuel cell, and many such single cells can be combined to form a fuel cell stack, increasing the power output thereof. Multiple stacks can be coupled together to further increase power output.

One fuel cell configuration that is particularly useful is referred to as a flow shifting fuel cell system. In such a system, one or more stacks (or a divided stack) have their hydrogen (or other fuel) flowpaths configured to cycle the fluid containing the fuel back and forth through the stack such that ports that allow the flow of fuel to and from the stack can function as both fuel inlet and outlet, depending on the flow direction of the shifted fuel. As fuel flows back and forth through the stack in a semi-closed cyclical pattern, one port in the anode flowpath is accepting fuel into the stack, while another is passing the fluid out of the stack. Portions of the flowpath can be selectively closed off (i.e., dead-ended or dead-headed) to prevent the escape of the fuel during the back-and-forth cycling. A combination of valves or related flow manipulation devices can be used to effect the shift in flow direction, causing the role of the ports to reverse. After a certain number of cycles (such as, for example, when a nitrogen level has built up to the point where the hydrogen in the fluid is too diluted), a purging step can take place, as can the addition of fresh fuel.

During operation of a flow shifting fuel cell, water can build up in the anode flowpath. This may be due to (among other things) the diffusion of water from the fuel cell's cathode to the anode. If the amount of water present at the anode becomes too great, the anode can flood, causing a reduction in performance to drop. Excess water is further problematic in cold temperature situations, as prolonged exposure to such conditions may cause the water to freeze. Other forces can cause the anode flowpath to dry out. Thus, the design of a fuel cell requires that attention be paid to the amount of hydration to ensure that neither too much nor too little water be present.

Flow shifting fuel cell systems have advantages over other approaches, such as anode flowpath recirculation-based systems, for while both can be used to improve the hydration of anode flowpaths and the electrolytes, the recirculation-based system does so with recirculation pumps and other heavily-burdened components that, in addition to increasing system cost, weight and complexity, can wear out, thereby subjecting the system to greater maintenance concerns. In addition, the use of such pumps requires a source of power (for example, electrical power) that, being supplied by the operation of the fuel cells, reduces overall system efficiency.

Flow shifting fuel cells may use water separators as a way to manage the amount of water present in an anode or anode flowpath. Present water separation technologies are only configured to operate in one designated flow direction, which are incompatible with flow shifting configurations. Thus, to make present water separators compatible with flow shifting fuel cells, multiple separators with complex valving schemes are required. Such extra componentry is disadvantageous in that in addition to contributing to pressure drops (such as due to irreversible expansion) and timing issues within the flowpath, they introduce extra weight and cost. The use of numerous cooperating valves may also necessitate the use of actuators or controllers to determine when the valves need to be opened or closed.

It is desirable that a flow shifting fuel cell system provide the operability enhancements made possible through the use of bidirectional water separation techniques. It is further desirable that a water separator minimizes system complexity and maximize efficiency.

BRIEF SUMMARY OF THE INVENTION

A water separator for a flow shifting fuel cell system and a method of operating the system are disclosed. In accordance with a first aspect of the present invention, a flow shifting fuel cell system includes at least two fuel cell stacks and a water separator that is fluidly coupled between the stacks. In this way, at least a portion of water present in a reactant fluid that passes through at least a part of the stacks is removed. The stacks each includes a plurality of fuel cells with an anode, cathode and an electrolyte disposed between each anode and cathode. An anode flowpath is fluidly coupled to the anode such that a fluid containing a first reactant (such as hydrogen or a related fuel) can be circulated back and forth across the anode. In the present context, the generally back and forth motion of the first reactant as it cycles through the anode flowpath correspond to first and second flow directions inherent in a flow shifting system. Generally, the first and second directions are opposite of each other. A cathode flowpath is fluidly coupled to the cathode such that a fluid containing a second reactant (such as air or a related oxygen-bearing fluid) can be circulated across the cathode. In the present context, a fluid that circulates "across" the anode or cathode will be understood to encompass situations where the fluid comes in contact with one of the electrodes in such a way as to allow ionization of the respective first or second reactant by the appropriate catalytic reaction. Thus, the flow of a fluid through a generally porous anode or cathode to achieve such ionization will be considered to flow across such anode or cathode. The water separator includes a housing defining a separation chamber therein; a bidirectional flowpath configured to allow the anode fluid to be circulated back and forth through the separation chamber; at least one fluid drain formed in the separation chamber such that condensed water removed from the anode fluid flows to the drain.

Optionally, the separation chamber can be of numerous configurations that are compatible with bidirectional flow. Suitable forms may include a labyrinth separator, where numerous baffles or related flow impediments may be disposed in the water separator's separation chamber to effect inertial impact between water molecules present in the fluid and the baffles, a double cyclone separator that unlike a conventional single cyclone separator allows fluid to flow in either direction due to the opposing orientation of the two cyclones, a lamellar separator with protrusions extending from the lamellae surfaces to improve water droplet capture, and a wire mesh separator. This last example may be arranged in a substantially diagonal separation path or a substantially vertical or horizontal separation path. In the present context, the term "substantially" refers to an arrangement of elements or features that, while in theory would be expected to exhibit exact correspondence or behavior, may, in practice embody something slightly less than exact. As such, the term denotes the degree by which a quantitative value, measurement or other related representation may vary from a stated reference without resulting in a change in the basic function of the subject matter at issue.

In addition, the system may include one or more flow manipulation devices (such as a valve) fluidly disposed in the anode flowpath to facilitate the back and forth circulation of the fluid that is carrying the fuel or related first reactant. In one form, numerous valves can be made to work in cooperation with one another, while in another, one or more three-way valves may be used. In addition, a controller may be included and signally coupled to the valves to provide some measure of automation of the back and forth flow. Dead-heading and introduction of new reactants are all functions that may be facilitated by the selective opening and closing of the valves. Additional valves may be also included in the anode flowpath to facilitate bleeding, purging or other related functions.

The system may further include a controller cooperative with the one or more sensors (for example, pressure sensors, temperature sensors, or both) and the one or more valves. In this way, the controller can use a programmed algorithm to correlate valve opening and closing with various flow direction, temperature and/or pressure conditions. The controller may also be configured to monitor other system parameters (for example, system load) that could be used to determine when a particular threshold has been reached. In this way, the controller can further tailor an opening and closing sequence of the one or more valves. The controller can also be used in conjunction with the sensors to determine when purging and new fuel introduction operations are warranted. For example, part of manipulating the one or more valves may include closing the valve after the passage of a certain amount of time that corresponds to a duty cycle, such as the duration of one complete anode flowpath operating cycle (which may be on the order of a few seconds), or it may correspond to that passage of time that is proportional to the concentration of nitrogen or other diluting agents. The conditions under which these and other operations are suitable can be represented in the controller by values in a lookup table or related data storage device.

In another option, a vehicle employing the system may use the system as a source of motive power for the vehicle. Such vehicle may be, for example, a car, truck, aircraft, spacecraft, watercraft or motorcycle. The source of motive power may provide direct or indirect propulsive force, the latter through (by way of example) a mechanical coupling to one or more wheels or fluid-engaging means, such as a propeller. Particularly, the vehicle may include a platform configured to carry the system, a drivetrain rotatably responsive to output from the source of motive power, and one or more wheels connected to the drivetrain.

According to another aspect of the invention, a flow shifting fuel cell system includes at least one fuel cell stack with numerous individual fuel cells, each of which include an anode, cathode and membrane (or related electrolyte) disposed between the anode and cathode. A cathode flowpath is configured to couple the cathodes of the individual fuel cells within the stack to a source of an oxygen-bearing fluid, while an anode flowpath is configured to couple the anodes of the individual fuel cells within the stack to a source of fuel-bearing fluid. The anode flowpath is configured such that fuel present within it cycles back and forth. The system also includes one or more flow manipulation devices fluidly coupled to the anode flowpath and configured to regulate the flow of the fuel-bearing fluid. A water separator is placed in fluid communication with the anode flowpath to separate water from the fuel-bearing fluid while the fuel-bearing fluid cycles back and forth within the flowpath.

According to another aspect of the invention, a method of operating a fuel cell system is disclosed. The method includes configuring the system such that a fuel-bearing fluid is capable of cycling back and forth through an anode flowpath between a plurality of ports that define alternating inlet and outlet ports of a fuel cell stack. By cycling the fuel-bearing fluid through an anode flowpath, the system functions as a flow shifting fuel cell. The method further includes flowing an oxygen-bearing fluid through a cathode flowpath, reacting at least a portion of the fuel-bearing fluid and at least a portion of the oxygen-bearing fluid such that water is produced, and separating water that accumulates in the anode flowpath while the cycling occurs.

Optionally, the method further includes purging the anode flowpath of at least a portion of the fuel-bearing fluid. In another option, the separating occurs in a passive water separator. In another option, liquid water that has collected in the water separator can be drained. Furthermore, the cycling specifically includes introducing the fuel-bearing fluid into the anode flowpath such that the fuel flows through the stack in a first direction, and reversing the flow of the fuel-bearing fluid through the anode flowpath such that the fuel flows through the stack in a second direction that is substantially opposite of the first direction. This approach may further include manipulating at least one valve to facilitate the cycling. The flow manipulation may be based on one or more valves, including three-way valves as previously mentioned. In this way, bleeding, purging or introducing fuel into the anode flowpath can be controlled through the valve. The method may further include configuring a controller to cooperate with the one or more valves to selectively actuate them. One specific example of valve manipulation involves closing certain valves to dead-head at least a portion of the anode flowpath.

BRIEF DESCRIPTION OF THE SEVERAL VIEWS OF THE DRAWINGS

The following detailed description of the present invention can be best understood when read in conjunction with the following drawings, where like structure is indicated with like reference numerals and in which:

FIGS. 4A and 4B show a schematic labyrinth water separator according to an aspect of the present invention;

DETAILED DESCRIPTION OF THE PREFERRED EMBODIMENTS

Figure 1:
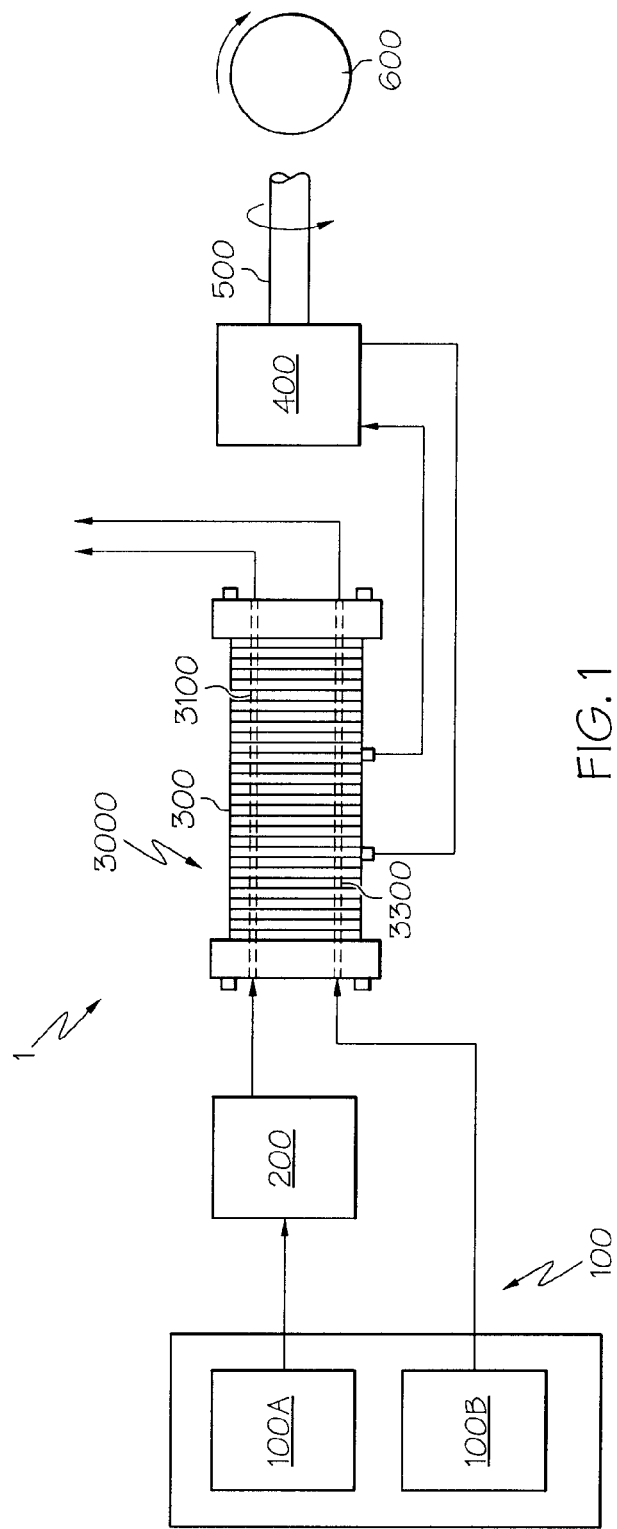
FIG. 1 shows a block diagram of a fuel cell system, including a fuel cell stack, configured for vehicular application.
Figure 9:
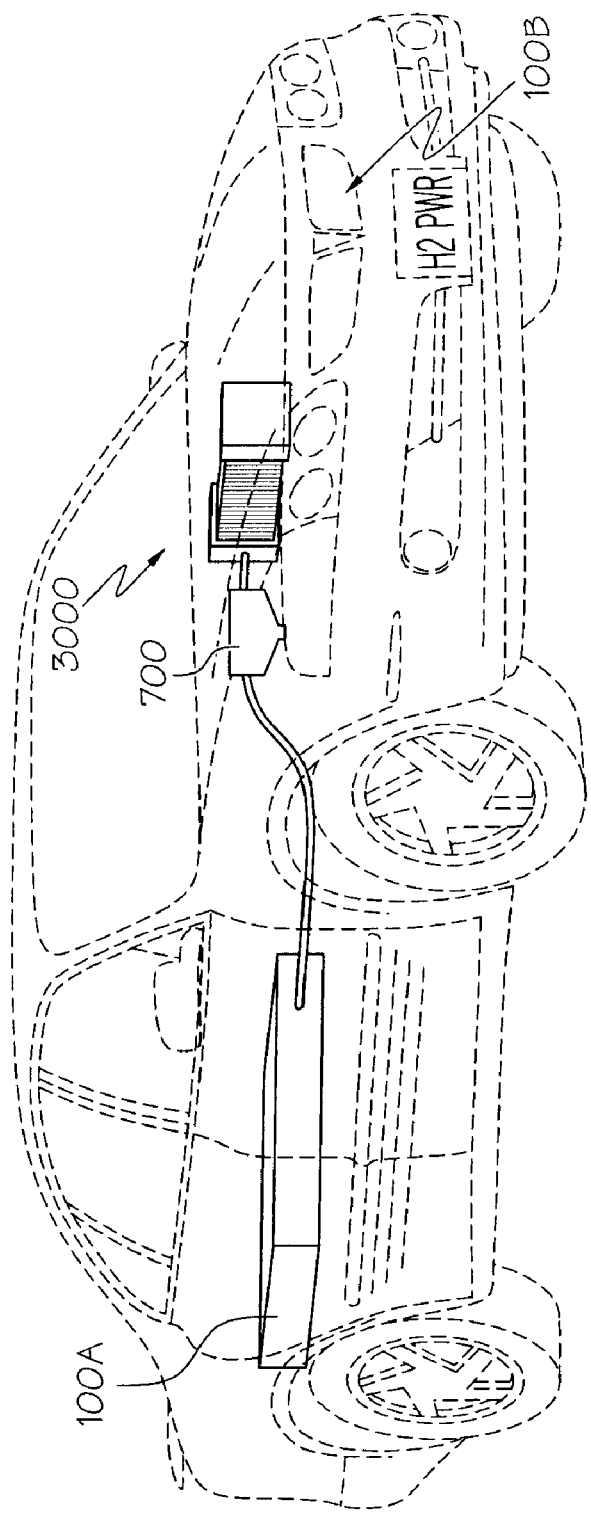
FIG. 9 shows a vehicle employing the flow shifting fuel cell system of the present invention.

Referring initially to FIGS. 1 and 9, a block diagram highlights the major components of a mobile fuel cell system 1 (FIG. 1), as well as a representative placement of a fuel cell system into an automotive application (FIG. 9). Referring with particularity to FIG. 1, the system 1 includes a reactant delivery system 100 made up of fuel source 100A and oxygen source 100B, fuel processing system 200, stack 3000 containing multiple fuel cells 300, one or more optional energy storage devices 400, a drivetrain 500 and one or more motive devices 600, shown notionally as a wheel. One or both of the fuel or oxygen sources 100A, 100B may be supplied via tank or related container, and may optionally be pressurized by a compressor or related pump. While the present system 1 is shown for mobile (such as vehicular) applications, it will be appreciated by those skilled in the art that the use of the stack 3000 and its ancillary equipment is equally applicable to stationary applications.

The fuel processing system 200 may be incorporated to convert a raw fuel such as methanol into hydrogen or hydrogen-rich fuel for use in fuel cell 300; otherwise, in configurations where the fuel source 100A is already supplying substantially pure hydrogen, the fuel processing system 200 may not be required. The energy storage devices 400 can be in the form of one or more batteries, capacitors, electricity converters, or even a motor to convert the electric current coming from the fuel cell 300 into mechanical power such as rotating shaft power that can be used to operate drivetrain 500 and one or more motive devices 600. As stated above, the energy storage devices 400 are optional; as such, they are not necessary to the operation of the system 1, and may be done away with a certain configurations.

Figure 2:
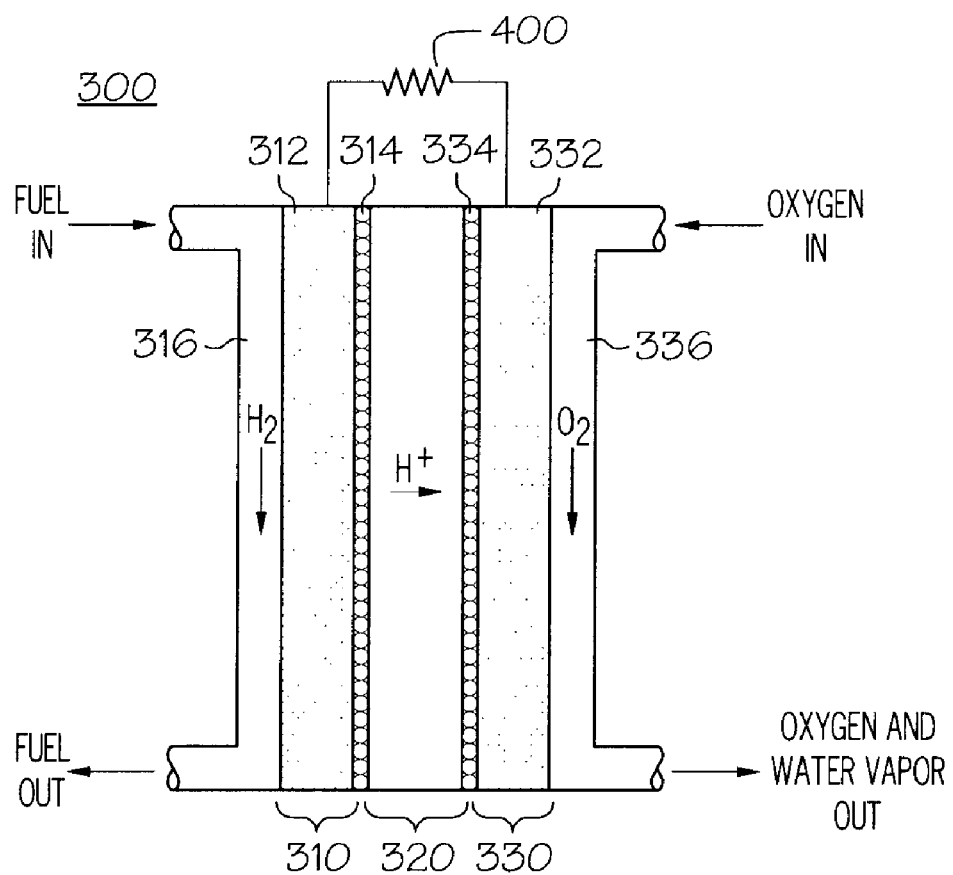
FIG. 2 shows a representative single fuel cell that is used to make up the fuel cell stack of FIG. 1.

Referring next to FIG. 2, fuel cell 300 includes an anode 310, cathode 330, and electrolyte 320 disposed between anode 310 and cathode 330. In a preferred configuration, the fuel cell 300 is a PEM fuel cell, and while the present invention is especially applicable to PEM fuel cells, the use of other fuel cell configurations with the present invention is also within the purview of the present disclosure. The anode 310 includes a generally porous electrode substrate 312 (also referred to as a diffusion layer) and catalyst layer 314 connected to an anode flowpath 316. The cathode 330 includes a generally porous electrode substrate 332 that is also configured as a diffusion layer and catalyst layer 334 connected to a cathode flowpath 336. Together, the substrates 312, 332, catalyst layers 314, 334 and electrolyte 320 define an MEA 350. Anode and cathode flowpaths 316, 336 (parts of which may be formed, for example, as grooves in a bipolar plate (not shown) contact their respective anode and cathode to allow delivery of the appropriate reactants. Fuel (typically in the form of gaseous hydrogen) comes in contact with a catalyst (such as platinum or a related noble metal) on the catalyst layer 314 of anode 310. Electrochemical oxidation of the hydrogen fuel proceeds by what is believed to be a dissociate adsorption reaction facilitated by the catalyst. The positively-charged hydrogen ion (proton) produced at the anode 310 then passes through the electrolyte 320 to react with the negatively-charged oxygen ions generated at the cathode 330. The flow of liberated electrons from the ionization of the fuel sets up a current through an external circuit that may include the energy storing devices or other load 400 such that a motor or related current-responsive device may be turned.

Figure 3:
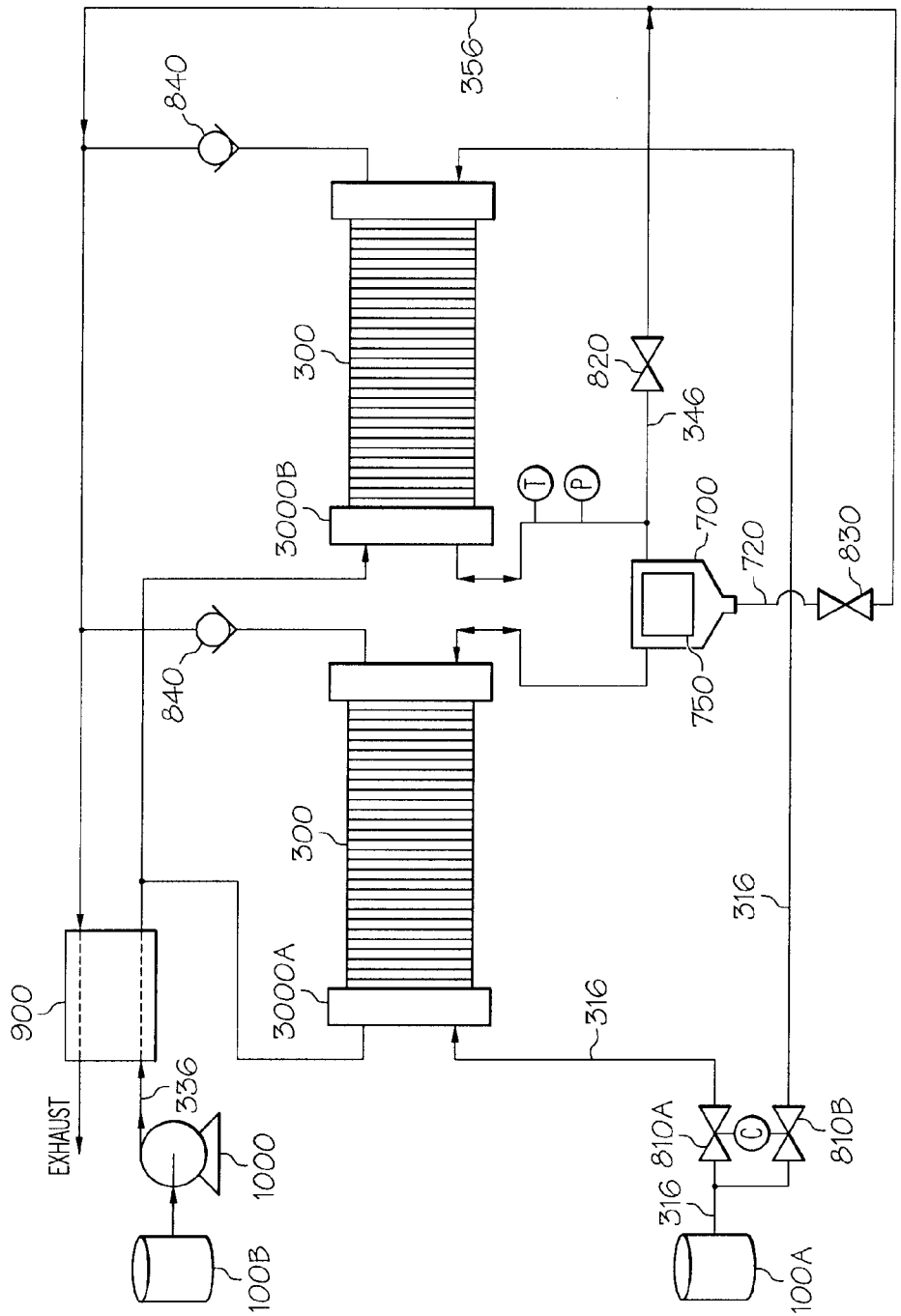
FIG. 3 shows a schematic diagram of a notional flow shifting fuel cell system.

Referring next to FIG. 3, a schematic diagram of fuel cell system 1 configured as a flow shifting system is shown. In such a system, two stacks 3000A and 3000B cooperate to cycle fuel from fuel source 100A back and forth between them through anode flowpath 316. While stacks 3000A and 3000B may notionally be referred to as a first and second stack respectively, that nature of the flow shifting system 1 is such that those skilled in the art will understand that such labels are relative, changing with each half-cycle shift in flow direction. In operation, hydrogen is delivered from fuel source 100A into stack 3000A through open valve 810A while valve 810B can be closed (i.e., dead-ended) to define a first half of the cycle. Fuel can be delivered through either a pump (not shown) or a pressurized fuel source (such as a pressurized hydrogen tank), or by some other means. In a second half of the cycle, the flow is reversed by opening valve 810B and simultaneously closing valve 810A. By having one of the valves open while the other is closed has the effect of causing the flow through the anode flowpath 316 to be in series through the stacks 3000A and 3000B. A controller C can be signally coupled to the valves 810A, 810B to provide flow shifting logic or related algorithm. Input as to when to change between the two half cycles may be based on sensed values of temperature and pressure (shown by respective sensors T and P), or by other values, such as a measured stack voltage (not shown). The two half cycles together allow the direction of the anode flow to oscillate back and forth such that it passes between the stacks 3000A, 3000B in a semi-closed pattern. Evidence of such back-and-forth movement of the fuel can be seen in the parts of the anode flowpath 316 marked with bidirectional arrows.

Anode flowpath 316 defines a continuous loop that fluidly connects to stacks 3000A, 3000B through ports (not shown) that penetrate the housing of the stacks as well as the individual fuel cells 300 within each of the stacks. As discussed above, valves 810A and 810B are used to selectively alter the direction of fluid flow through the anode flowpath 316 and stacks 3000A and 3000B. Valves 810A and 810B may take on numerous configurations known to those skilled in the art, including two-way and three-way valves. Bleed flowpath 346 and valve 820 are fluidly connected to anode flowpath 316 to allow for bleed, purging or related functions that may be periodically necessary. Fluid that is bled or purged through valve 820 is dumped into drain line 356 that contains wet, used air from the stacks 3000A, 3000B, as well as from other sources as will be discussed in more detail below. Such operations are valuable in that they allow the introduction of fresh fuel into the anode flowpath 316 and stacks 3000A, 3000B once a sufficient number of cycles have been run. Although the present configuration shows a pair of two-way valves 810A and 810B, it will be understood that some redundancy may be removed through the use of a single three-way valve.

Check valves (not shown) can be used to avoid reverse flow during certain parts of the back and forth cycling of the fluid in the anode flowpath 316. In addition to the valves 810A, 810B, controller C (which is shown in a central form, but will be appreciated as also encompassing a distributed configuration) communicates with the various components of fuel cell system 1 to control and coordinate their operation. For example, controller C may be made to communicate with pump 1000 or another source of pressurized reactant (such as an oxygen fuel tank). The controller C may also be used for other fuel cell functions, such as operating a coolant supply system (not shown). The controller C may include one or more application specific integrated circuits (ASICs) or related modules that provide the desired functionality. Such devices may define a programmable logic controller or other processing unit. They may further include shared, dedicated or group processors, supporting electronic circuit, and a memory that together execute one or more software or firmware programs. In such case, certain algorithms could be programmed into and used by an ASIC, module or other logic device within controller C to manipulate flow shifting times, purging valve opening and closing instructions or the like.

During operation, the direction of the fluid flow in the anode flowpath 316 oscillates back and forth such that it passes between the stacks in a semi-closed pattern. During a first part of the flow shifting cycle, anode flowpath 316 is used as a conduit to deliver the pressurized fluid past the anodes 312 (shown in FIG. 2) of the various fuel cells 300. As mentioned above, in this part of the cycle, valve 810B may be closed so that the anode flowpath 316 is dead-headed. During a second part of the flow shifting cycle, the flow reverses direction such that the hydrogen-bearing fluid passes through valve 810B on its way through flowpath 316, again past the anodes 312 of the various fuel cells 300. During both parts of the flow shifting cycle, an oxygen-bearing fluid is being routed through the cathode flowpath 336 in an appropriate manner to facilitate the electrochemical reaction between the hydrogen and oxygen at the cathode 332 (shown in FIG. 2). After a sufficient number of cycles, which may be determined in part by the residual hydrogen concentration in the hydrogen-bearing fluid, a bleed cycle can be initiated in the anode flowpath 316 to remove the built-up nitrogen. In addition, a purge valve (not shown) and accompanying purge cycle may be run to dry out the anodes 312 of fuel cells 300. Such a purge may be valuable for periods of fuel cell 300 inactivity to make the fuel cell 300 freeze-capable.

A water vapor transfer unit 900 may be placed in cathode flowpath 336 and cooperative therewith to allow humidification of the reactant coming from the oxygen source 100B. For example, fresh air coming from oxygen source 100B may have moisture contributed to it within the water vapor transfer unit 900 by interaction with used air that may come from the cathode outlet of the fuel cell stack 3000, humidified with anode water that may come from the drain of the water separator 700. The used wet air that exits the water vapor transfer unit 900 may then be exhausted from drain line 356.

A water separator 700 is disposed such that as the fuel-bearing fluid is cycling back and forth through the anode flowpath 316, the fluid passes through the water separator 700, which includes a separation chamber 750 where the fluid interacts to shed some of the water droplets, moisture or other condensate being carried with the fluid. Generally, the water separator 700 is arranged with the separation chamber 750 situated vertically higher than a drain 720 such that water collected in the separation chamber 750 can be gravity-fed to the drain 720 for removal through drain line 356. Check valves 840 may be included in appropriate places (such as in the portion of cathode flowpath 336 that is downstream of stacks 3000A and 3000B) to avoid the wet, used air that passes through the drain line 356 from entering cathode flowpath 336. Particular embodiments of the water separator 700 are described in more detail below. Drain valve 830 can be used to regulate the flow from the water separator 700 to the drain line 356.

Referring next to FIGS. 4A through 8D, various forms of water separators 700 are shown. As will become apparent from the context, the designation 700 covers the present invention water separators generally, while specific embodiments 700A, 700B, 700C and 700D are used to represent the labyrinth, double cyclone, wire mesh and lamellar versions, respectively. In each variant of the water separator 700, ports 316A, 316B that fluidly form a portion of the anode flowpath 316 facilitate the bidirectional flow of fluid through the water separator 700 by providing the necessary alternating inlet and outlet. Referring with particularity to top view FIG. 4A and side view FIG. 4B, labyrinth water separator 700A is shown, as well as the bidirectional connection to anode flowpath 316 through ports 316A, 316B. Individual baffles 710A are spaced along the directions of fluid flow to define a tortuous path. In this way, water droplets present in the fluid have a relatively high inertia relative to gaseous portions of the fluid, and tend to impact with and adhere to the baffles 710A. When a sufficient quantity of water collects on the baffles 710A, it can drop down into the drain 720.

Figure 5A:
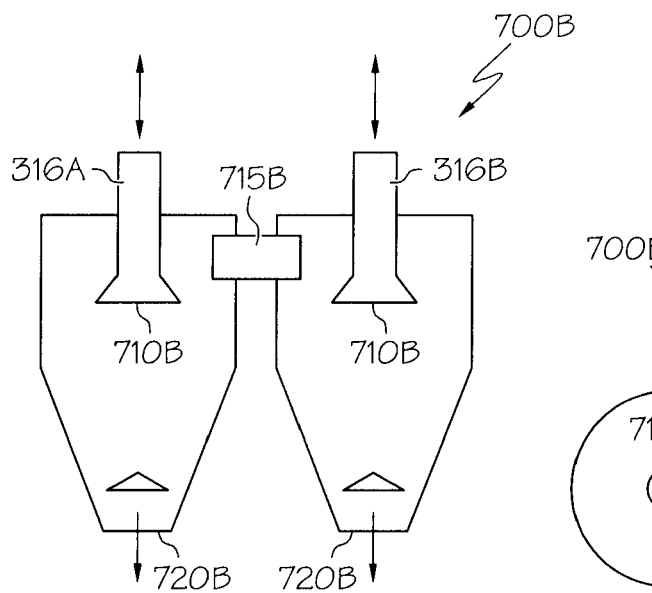
FIGS. 5A and 5B show schematic elevation and top views of first variation of a dual cyclone water separator according to an aspect of the present invention.
Figure 5B:
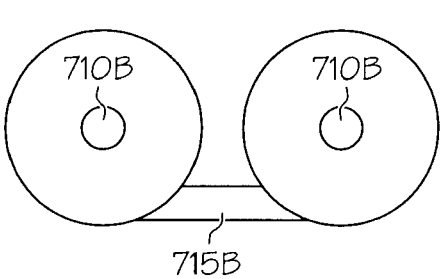
Figure 5C:
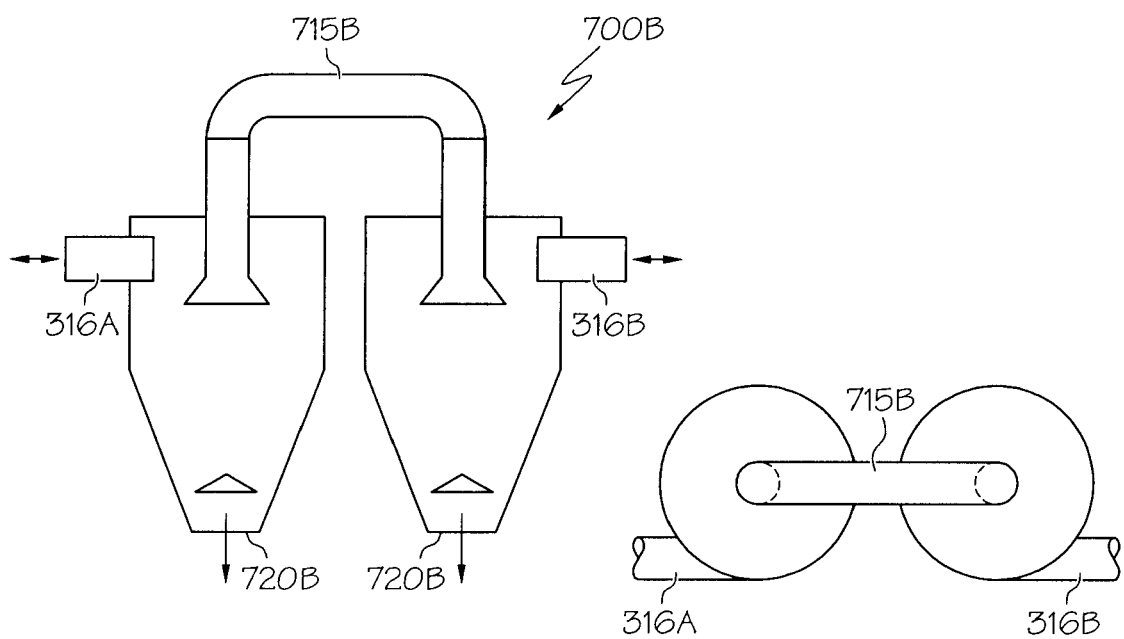
FIGS. 5C and 5D show schematic elevation and top views of second variation of a dual cyclone water separator according to an aspect of the present invention.
Figure 5D:
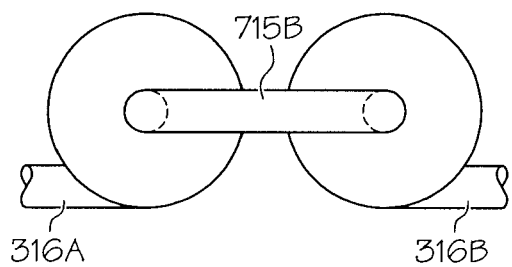
Figure 8A:
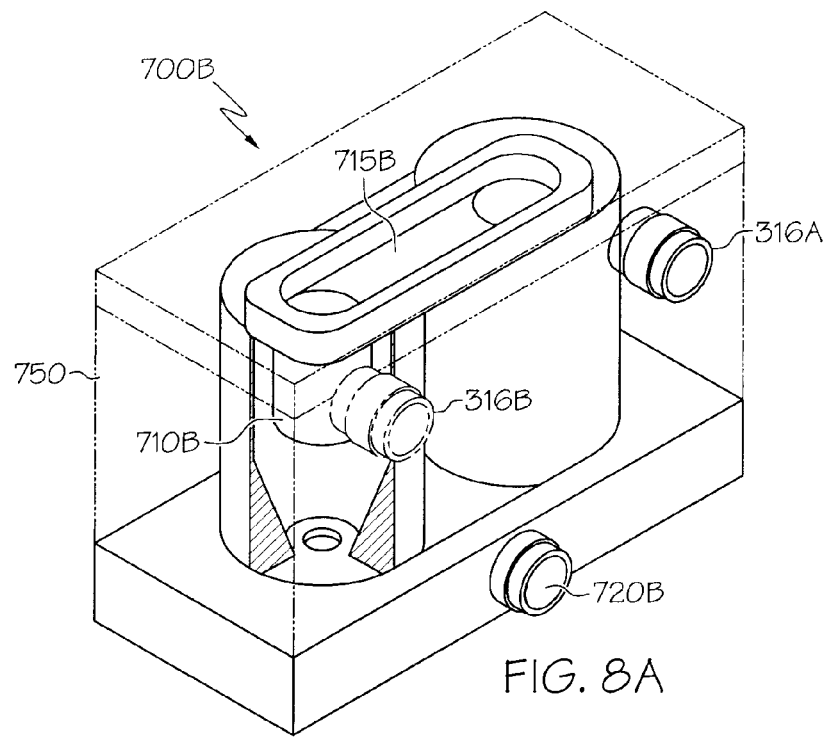
FIGS. 8A through 8D show more detail of the dual cyclone, lamellar, and wire mesh water separators of FIGS. 5A, 5B, 7A, 7B, and 6A and 6B, respectively.

Referring with particularity to FIGS. 5A through 5D and 8A, double cyclone water separators 700B are shown. The fluid enters into double cyclone water separator 700B through the ports 316A, 316B. Once inside the separation chamber 750, common passage 715B acts as the inlet to each of the cyclones. As can be seen with particularity in FIG. 5B, the inlets 316A and 316B introduces the fluid into each cyclone tangentially, thereby producing a swirling motion that by centrifugal action propels the droplets of water present in the fluid against the walls of the cyclones, where they tend to adhere. This centrifugal motion tends to leave the gas in the middle of the cyclone relatively liquid-depleted, and it is this centrally-located portion of the fluid stream that tends to exit through outlets 710B. FIG. 8A shows a cutaway view that highlights the fluid cooperation between the two cyclones 700B1 and 700B2. FIGS. 5C, 5D and 8A show a variant where it is the first-encountered cyclone that provides the cyclone action, while FIGS. 5A and 5B show a variation where now the second-encountered cyclone is always the active one relative to the passing fluid. In both cases, a common passageway 715B is used to fluidly connect the cyclones 700B1 and 700B2. Ports 316A and 316B cooperate to allow inflow and outflow of fluid to the separation chamber 750, while drain 720 allows for the passage of collected water from the water separator 700B.

Figure 6A:
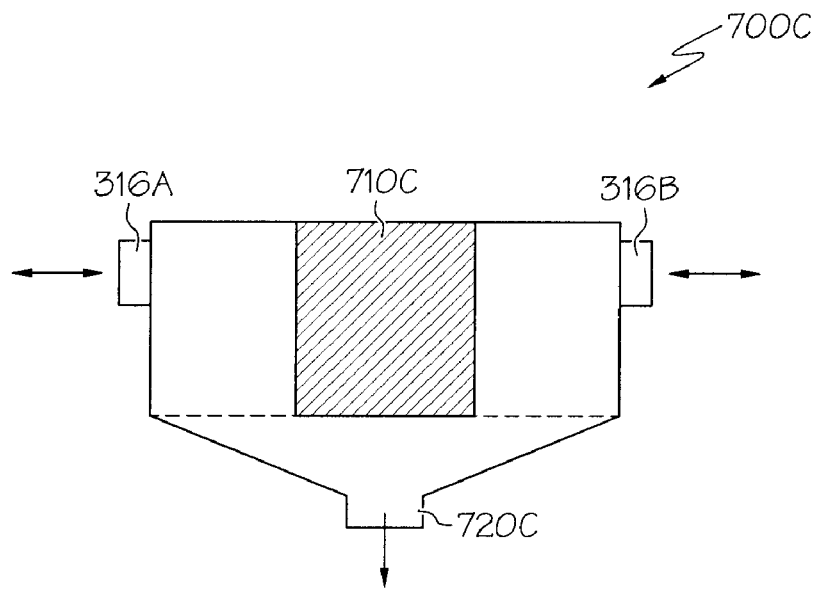
FIGS. 6A and 6B show two variations on a schematic wire mesh water separator according to an aspect of the present invention.
Figure 6B:
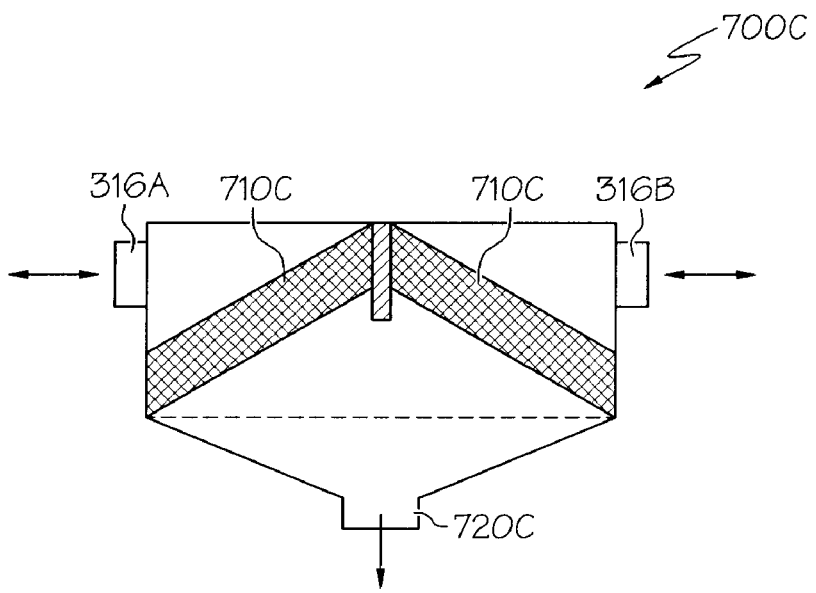
Figure 8B:
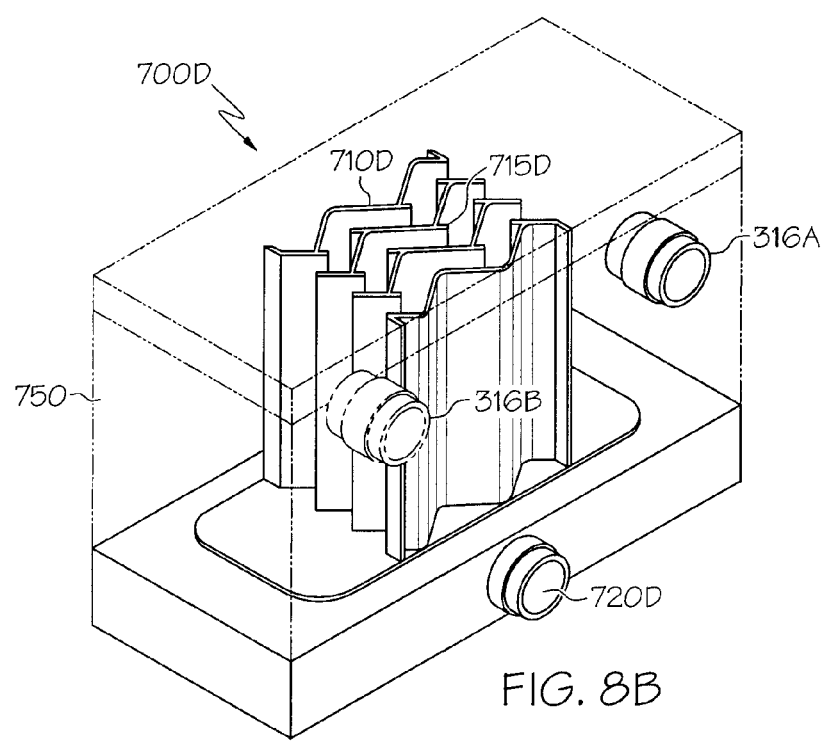
Figure 8C:
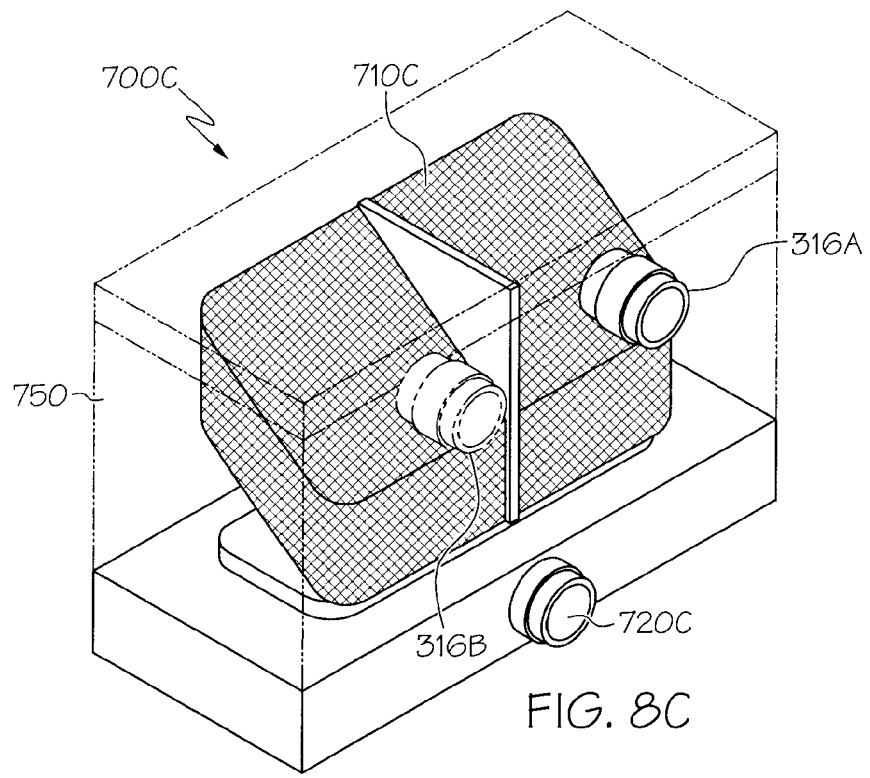
Figure 8D:
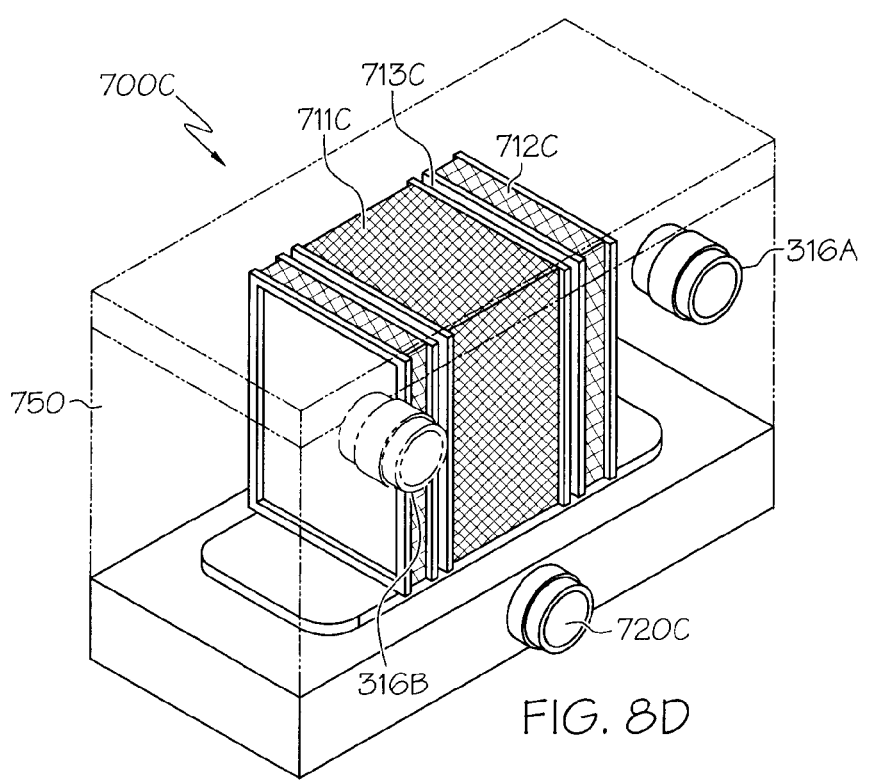

Referring with particularity to FIGS. 6A, 6B and 8C and 8D, a wire mesh water separator 700C is shown. In this case, the wire mesh 710C can be formed from one or more densities of mesh material. As shown with particularity in FIG. 8D, the wire mesh 710C is a multilayer laminate made up of various densities of mesh, including a high density region 711C, low density region 712C and even optional air gaps 713C. FIG. 6A, in conjunction with FIG. 8D, shows a generally vertical wire mesh 710C, while FIG. 6B, in conjunction with FIG. 8C, shows a generally diagonal wire mesh 710C. Testing has shown that the embodiment of FIGS. 6A and 8D is particularly well-suited to removing moisture from the fluid at a variety of flow conditions. One possible explanation is that, in addition to having the water droplet-trapping attributes of the mesh material, the relatively large volume into which the water-bearing fluid expands when entering into the water separator 700C from anode flowpath 316 causes significant expansion of the gaseous part of the fluid. This expansion causes a reduction in velocity of the fluid, while the liquid part impacts the wire mesh 710C, thereby separating from the fluid, after which the effects of gravity promote the collection of the separated droplets in drain 720. Ports 316A and 316B, as well as separation chamber 750 and drain 720C function in a manner generally similar to that of the previous variant water separators.

Figure 7A:
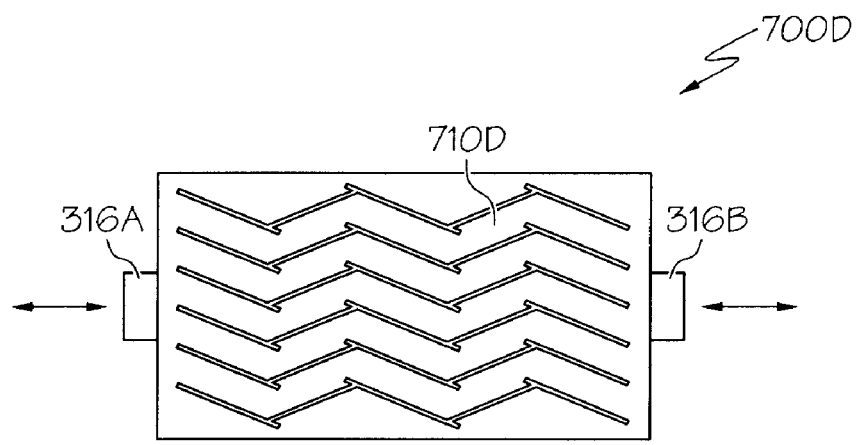
FIGS. 7A and 7B show a schematic lamellar water separator according to an aspect of the present invention.
Figure 7B:
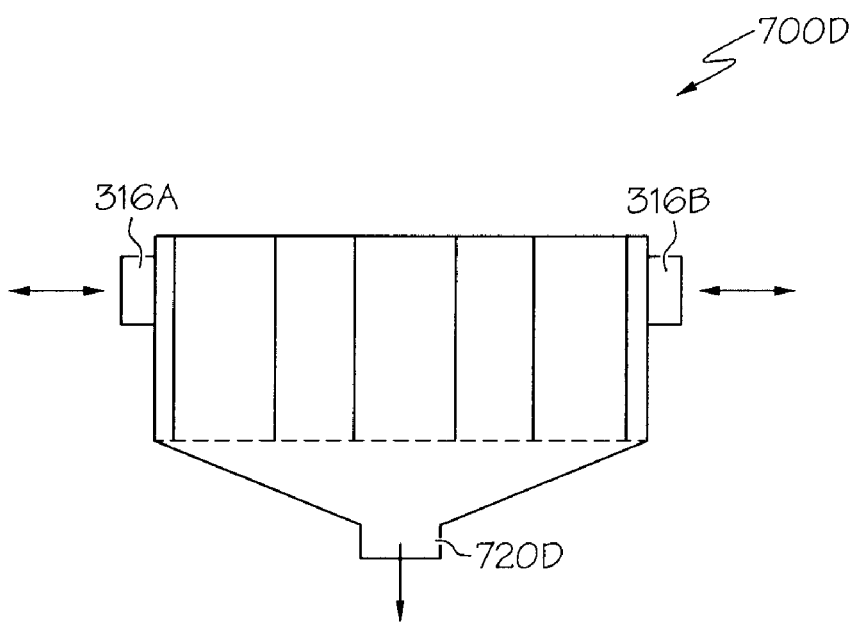

Referring with particularity to FIGS. 7A, 7B and 8B, a lamellar structured water separator 700D is shown. Detents 715D that project into the fluid flowpath from the generally sinusoidal-shaped lamellae 710D are used to capture moisture. The generally vertical orientation of the lamellae 710D promotes the downward flow of capture water droplets into drain 720D.

While certain representative embodiments and details have been shown for purposes of illustrating the invention, it will be apparent to those skilled in the art that various changes may be made without departing from the scope of the invention, which is defined in the appended claims.

What is claimed is:

1. A flow shifting fuel cell system comprising:
   a first fuel cell stack and a second fuel cell stack, each said stack comprising:
     a plurality of fuel cells, each comprising an anode, a cathode and an electrolyte disposed between said anode and cathode;
     an anode flowpath fluidly coupled to said anode such that a fluid containing a first reactant can be circulated back and forth across said anode; and
     a cathode flowpath fluidly coupled to said cathode such that a fluid containing a second reactant can be circulated across said cathode; and
   a water separator fluidly coupled to said anode flowpath such that at least a portion of water present in said first reactant-containing fluids is removed therefrom, said water separator comprising:
     a housing defining a separation chamber therein;
     a bidirectional flowpath configured to allow said respective one of said fluids to be circulated back and forth through said separation chamber; and
     at least one fluid drain formed in said separation chamber such that condensed water removed from said respective one of said fluids flows to said drain, and wherein said separation chamber comprises a labyrinth separator symmetric about an axis defined by the median between where the flowpath enters and exits the water separator.

2. The system of claim 1, further comprising at least one flow manipulation device fluidly disposed in said anode flowpath to facilitate said back and forth circulation of said fluid containing a first reactant.

3. The system of claim 2, wherein said at least one flow manipulation device comprises at least one three-way valve.

4. The system of claim 2, wherein said at least one flow manipulation device comprises a plurality of valves working in cooperation with one another.

5. The system of claim 4, further comprising a controller signally coupled to said plurality of valves.

6. A vehicle comprising the system of claim 1, wherein said system serves as a source of motive power for said vehicle.

7. A flow shifting fuel cell system comprising:
   at least one fuel cell stack comprising a plurality of individual fuel cells, each of said individual fuel cells comprising an anode, a cathode and a membrane disposed between said anode and cathode;
   a cathode flowpath configured to couple said cathodes of said individual fuel cells within said stack to a source of an oxygen-bearing fluid;
   an anode flowpath configured to couple said anodes of said individual fuel cells within said stack to a source of fuel-bearing fluid, said anode flowpath configured such that fuel present within said anode flowpath cycles back and forth therethrough;
   at least one flow manipulation device fluidly coupled to said anode flowpath and configured to regulate said flow of said fuel-bearing fluid therethrough; and
   a labyrinth water separator in fluid communication with said anode flowpath, said labyrinth water separator configured to separate water from said fuel-bearing fluid while said fuel-bearing fluid cycles back and forth within said anode flowpath wherein said labyrinth water separator is symmetric about an axis defined by the median between where the flowpath enters and exits the water separator.

8. The system of claim 1, wherein the housing is configured such that the bidirectional flowpath enters and exits the water separator on the same side of the housing.

9. The system of claim 7, wherein the anode flowpath enters and exits the labyrinth water separator on the same side of the labyrinth water separator.

* * * * *